Figure 2:
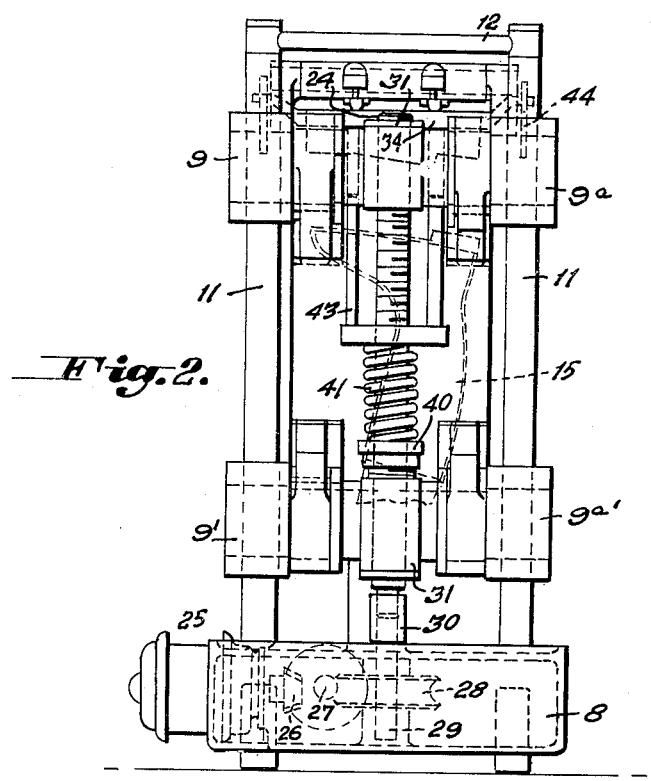

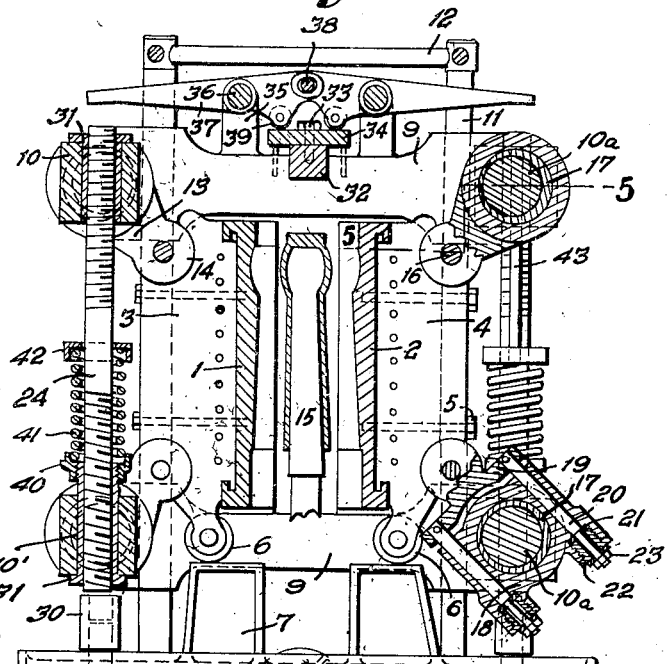
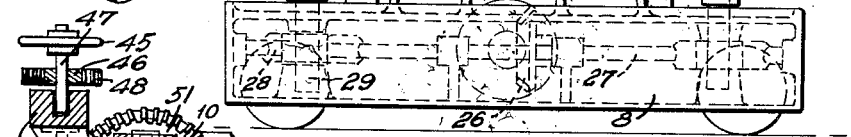
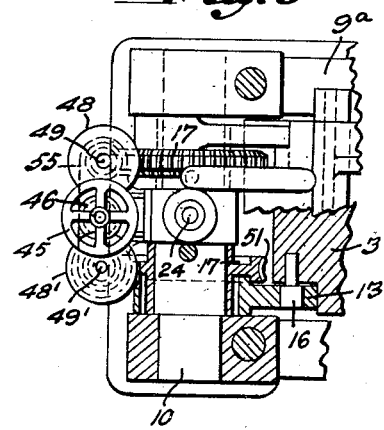

Inventor
Alois Bánovský

Patented May 29, 1951

2,554,552

UNITED STATES PATENT OFFICE 2,554,552

PRESS FOR THE MANUFACTURE OF HOLLOW ARTICLES FROM RUBBER OR OTHER VULCANIZABLE MATERIAL

Alois Bánovský, Zlin, Czechoslovakia, assignor to Bata, narodni podnik, Zlin, Czechoslovakia Application March 25, 1947, Serial No. 736,964
In Germany September 17, 1943

15 Claims. (Cl. 18—17)

1

The present invention relates to a press structure for use in manufacturing hollow articles from rubber or other vulcanizable material.

More particularly the invention relates to a press for manufacturing rubber footwear.

Known presses of this character, for the manufacture of rubber footwear, have been so constructed that the last which is arranged on a press table acts as the core of the mould and is moved, while the mould is being closed, towards a stationary but resiliently yielding part of the mould. The lateral parts of the mould which also rest on the movable table are moving simultaneously towards the last during mould closure. In such an arrangement the motion is transmitted from an electric motor through belts to a countershaft with a worm meshing with a worm wheel, on the shaft of which eccentrics are provided, which by way of connecting rods raise the table with the mould last and the lateral mould parts, whereby the mould is closed.

Presses of this kind are suitable only for the production of low footwear, which does not require a very great pressing pressure. In cases where great pressing pressures are required (for instance in the production of high boots), presses of the known construction will be far too heavy, as the great pressing pressures have to be absorbed by the machine frame which would have to be designed accordingly.

One disadvantage of the presses of known construction is due to the fact that the lateral parts of the mould must be made and fitted perfectly accurately, as a subsequent adjustment of them cannot readily be effected. Important parts to the driving means of the known presses are not easily accessible, so that every repair of this arrangement entails complete dismantling of the press. The transmission of power by belts, the employment of which is necessitated by the construction of the known driving means, involves rapid wear.

The present invention has for its object to do away with all the disadvantages referred to of the presses as hitherto known for the production of hollow articles, more particularly of footwear made of rubber or some other vulcanizable material, and consists in this, that the motions of the lateral heating cheeks with the associated parts of the mould towards or away from the mould core are imparted to them by rotatably attached arms which are pivotally mounted on connecting beams of press yokes.

The main advantage of this arrangement resides in this, that the press yokes form independent, statically fixed elements which do not transmit the pressing pressures they take up to other parts of the press, so that the whole construction of the press will, as compared with other known presses, be very light for the same pressing pressures.

The press yokes with the rotatably attached arms move preferably in the vertical direction and are guided, for instance, on four columns, the arrangement being such that, on the mould closing, they move towards one another and, on the mould opening, away from one another. The drive of the press yokes is most suitably provided by driving screws with right-hand and left-hand threads, which receive their rotary motion from the flanged motor which is fixed directly to a box-like bedplate which also forms an oil container, so that the whole of the transmission gear can run in oil and provides a noiseless drive with the minimum of wear.

A lever system of the upper press yoke, which carries the heating plate with the upper part of the mould, is connected by means of pressure bars with springs in such a manner that the upper part of the mould is pressed yieldingly with suitable force against the mould core. As compared with the known method of springing the upper part of the mould the arrangement according to the invention provides the advantage, that the springs can be easily adjusted as regards their pressure effect and are only under load, when the mould is in the closed state.

Figure 3:
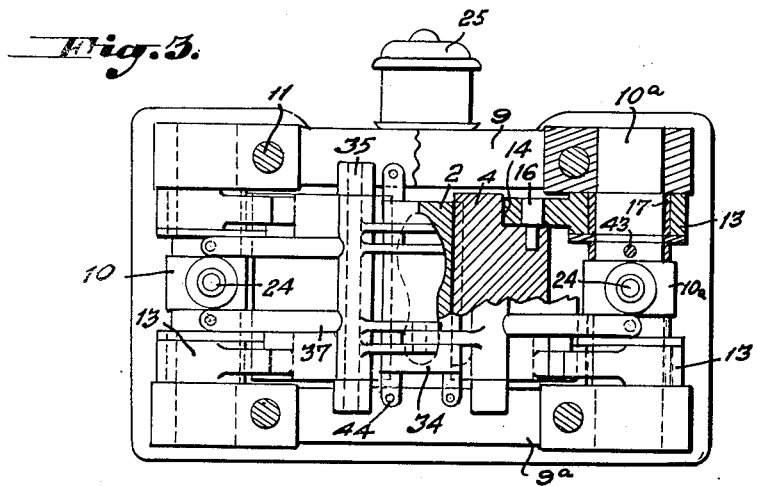

Further advantages and features of the invention will be gathered from the following description of a constructional example of a press according to the invention for the manufacture of top boots of rubber with reference to the accompanying drawings, in which:

Figure 1 shows the press in elevation and partly in section;

Figure 2 a side elevation,

Figure 3 a plan view, and in the right hand upper part of the same a partial horizontal section on the line I—I of Fig. 1.

Fig. 4 is a view partly in section and partly in elevation of the left side of a press similar to Fig. 1 with the addition of means for adjustment of the sleeves, and Fig. 5 is a top view partly in plan and partly in section of Fig. 4.

The lateral parts 1, 2 of the mould are slid into corresponding guides of the lateral mould cheeks 3, 4 which are, for instance, electrically heated and hold the mould parts 1, 2 by screws 5. These heating cheeks 3, 4 rest with rollers 6 on supports 7 of the box-like bedplate 8 and, therefore, move along these supports 7 when the mould is being closed and opened.

The pressing mechanism proper is formed by two pairs of press yokes 9, 9a and 9' and 9a', which are connected in pairs by the beams 10, 10a and 10' and 10a' respectively. The beams 10—10a connect upper yokes 9—9a and the beams 10'—10a' connect the lower yokes 9' and 9a'. In the constructional example shown, for closing the mould the press yokes move towards one another, being guided on columns 11, the lower ends of which are anchored in the bedplate 8 and the upper ends of which are connected by a frame 12.

In Figs. 4 and 5 is illustrated an arrangement providing for the common adjustment of four eccentric sleeves 17 on the one side of the press. This arrangement includes a hand wheel 45 and a gear 46 firmly connected with the shaft 47. Upon rotation of the hand wheel 45 the gear 46 imparts rotation to the gears 48 and 48'. These latter gears are keyed respectively to vertical shafts 49 and 49' having worms 50' which engage toothed flanges 50 of eccentric sleeves 17 and effect the rotation of the sleeves relative to the beam 10 whereby the arms 13 are displaced and with them the heating cheek 3 either to the left or to the right to press the mould parts 1, 2 close together as previously described. Each of the shafts 47, 49 and 49' is rotatably mounted in a bracket bearing 55.

The rotation of the sleeves 17 on the lower beam 10' is effected simultaneously with and in a similar manner as described in connection with the upper beam 10. The worms 50' rotate the flanges on the lower eccentric sleeves 17. These worms 50' are driven by two shafts, the upper portions of which are hollow portions 52. The lower ends of the shafts 49 and 49' are provided with keys 53 which engage in grooves in the upper ends of the inturned portion of the hollow shaft portion 52, and vents 54 are provided in the lower portion of this hollow shaft portion.

It is, therefore, obvious that upon rotation of the hand wheel 45 all four sleeves on one side of the press are rotated simultaneously. The rotation of the sleeves 17 on the other side of the press is effected in a similar manner with a similar arrangement.

The lateral heating cheeks 3, 4 are connected to the yokes through a plurality of arms 13 of which there are eight arranged in pairs, two pairs connected to each cheek 3 and 4 as is apparent from the drawings. The arms are respectively pivoted in pairs at the upper and lower portions of the cheeks 3 and 4 and to the adjacent yoke connecting beams 10, 10', 10a and 10a'. It will thus be seen that a pair of arms 13 on each cheek 3 and 4 are operatively connected with the upper press yokes 9, 9a and with the lower press yokes 9' and 9a'. It is therefore seen that the cheeks and the mould parts 1 and 2 move in a path of travel perpendicular to the mould core while the yokes move toward and away from one another in a path of movement transverse to the path of movement of the mould parts. The arms 13 transmit motion from the yokes to the cheeks and thereby the mould parts to apply pressure to the core when the mould closes.

On the mould closing, the pairs of press yokes are moved out of the position shown in Figure 1 towards one another, the rotatably attached arms 13 bearing in the cylindrical surfaces of the joints 14 against the lateral heating cheeks 3, 4 and forcing the latter against the mould core 15, until the rotatably attached arms 13 finally, on the mould closing, come into an approximately horizontal position. Conversely, on the mould opening, the pairs of press yokes are moved away from one another, whereby the rotatable arms 13 which are connected with the lateral heating cheeks 3, 4 by the pins 16 remove the said heating cheeks with the lateral parts 1, 2 of the mould away from the mould core.

It will therefore be seen that the yokes 9, 9a and the connecting beams 10, 10a constitute an upper press frame movable along the columns 11 and the yokes 9' and 9a' and the connecting beams 10' and 10a' constitute a lower press frame and the arms or links 13 pivotally connected to the beams and the respective cheeks 3 and 4 constitute means responsive to movement of the frames toward one another to effect movement of said mould parts 1 and 2 to mould closing position.

The requisite accurate adjustment of the lateral mould parts 1, 2 with respect to the mould core 15 is made possible by the rotatably attached arms 13 being mounted on adjustable sleeves 17 with slight eccentricity, through turning which the mould parts can be adjusted in a simple manner. In their adjusted position the sleeves 17 are then secured against undesired turning on the connecting beams 10 in a suitable manner. The individual adjusting sleeves 17 can either be separately adjustable or individual sleeves can be coupled with one another in such a manner that by means of a common hand wheel and a suitable toothed wheel transmission a plurality of sleeves 17, at least two at a time, can be turned simultaneously.

In order to prevent injury to the press through an unforeseen increase of the pressing pressure, which may, for instance, occur if a hard foreign body should get between the lateral parts of the mould, the rotatably attached arms 13 are preferably provided with safety devices which, on the maximum admissible pressure being exceeded, prevent the mould parts from moving further. In Figure 1 such a safety device is indicated at the right-hand lower arm. The rotatably attached arm is in this instance divided into two parts 18, 19, of which the part 18 is mounted so as to be rotatable on the eccentric adjusting sleeve 17, whilst the part 19 is connected to the lateral heating cheek 4. The two parts 18 and 19 are connected by bolts 20 which are fixed in the part 19, but are slidable in the part 18. The securing device itself consists of rings 21 which are inserted in bores of greater diameter of the guides for the bolts 20 and are tightened up by glands 22. The bolts 20 bear with suitable shoulders on these rings 21 and extend with their reduced ends through the screwed glands 22, against which they are tightened by nuts 23. On the maximum permissible pressure transmitted by the rotatably attached arms being exceeded, the safety rings 21 will be sheared off by the edges of the shoulders of the bolts 20, a further transmission of power being thereby made impossible. By loosening the nuts 23 and the screwed glands 22 the destroyed safety rings 21 can be readily removed and replaced by new ones.

Motion is imparted to the pairs of press yokes 9, 9a and 9', 9a' by means of two driving screws 24 with right-hand and left-hand threads, which are driven through suitable gearing from an electric motor 25. From this electric motor 25 is driven through bevel gearing 26 a countershaft 27, on the two ends of which are keyed worms meshing with worm wheels 28. The shafts 29 of these worm wheels are connected by way of couplings 30 with the driving screws 24. The bevel gearing and the worm transmission gearing are with advantage housed in the box-like bedplate 8 which also constitutes an oil container, so that the entire gearing runs in oil.

The driving screws 24 themselves engage with their threads in nuts 31 which are fixed in the connecting beams 10, 10' and 10a, 10a' of the press yokes.

The upper part 32 of the mould, which in the present example corresponds to the form and patterning of a shoe sole, is fixed by means of screws 33 to a heating plate 34 which is held by guide bars 44 to the upper pair of press yokes in such a manner as to be displaceable in the vertical direction with respect to the said press yokes. On these yokes 9, 9a are also provided supporting bearings 35 for the pivot pins 36 of two pairs of two-armed levers 37, which have their shorter arms connected to one another by pins 38 and bear with rollers 39 against the heating plate 34, thereby providing a springing of a kind known per se of the upper part 32 of the mould. During the pressing operation spring forces come into action through pressure transmitting bars on the longer, outer arms of the levers 37, as will be hereinafter described.

The nuts 31 which are pressed into the lower connecting beams 10', 10a' of the lower press yokes are each provided with an adjustable supporting plate 40 for a spring 41, against the upper end of each of which springs a spring plate 42 bears, which supports two pressure transmitting rods 43 (Figure 2) which extend through the upper connecting beams 10, 10a and during the pressing operation act on the free ends of the levers 37.

The described arrangement operates in the following manner:

The mould core, that is in the constructional example a last 15, which is carried by a swiveling arm, not shown, is pushed with the made-up shoe in the rough into the press. By starting up the electric motor 25 the screws 24 are put in rotation and the pairs of press yokes 9, 9a and 9', 9a' are caused to approach one another, the rotatably attached arms 13 moving the heating cheeks 3, 4 with the lateral parts 1, 2 of the mould towards the mould core 15. Through the lowering of the upper pair of press yokes 9, 9a, the upper part 32 of the mould is also caused to approach the mould core 15, until it rests on the material (for instance rubber) which is on the mould core and is intended to form the shoe sole. The gradual approach of the press yokes causes the pressure transmitting bars 43 finally to reach the ends of the levers 37 and, during the further motion, to force these upwards, the heating plate 34 together with the upper part 32 of the mould being pressed by means of the pressure rollers 39 against the mould core 15.

Since in this way the upper part 32 of the mould is caused to bear on the material lying on the mould core 15 before the press is completely closed, that is to say, as long as the longitudinal axes of the rotatably attached arms 13 have not yet reached the horizontal position, the springs 41 are preliminarily stressed and by means of the pressure transmitting bars 43 and the levers 37 or the pressure rollers 39 press the heating plate 34 with the upper part 32 of the mould against the mould core 15 with increasing force which only reaches its maximum value after the complete closing of the mould. This final pressure can be regulated at will by a suitable adjustment of the spring supporting plates 40.

The effect of this arrangement is, that, after the closing of the mould, during the transitional phase, in which the material commences to flow owing to the action of the heat, the mould becomes completely filled in every detail and the material is finally vulcanised under continuous pressure. After vulcanisation is complete, the electric motor 25 is started again with the opposite direction of rotation, whereby the press is opened and the shoe, completely vulcanised, can be removed from the press after the mould last has been pushed out.

The described constructional example can, of course, be modified in various details, without in any way affecting its manner of working, while modifications may appear desirable for the manufacture of other hollow articles. Thus, for instance, the motion of the press yokes 9, 9a and 9', 9a' for actuating the mould parts may be reversed, such that the closing of the mould is effected by moving the yokes away from one another and vice versa. The control of the motion of the press yokes may, instead of being effected by screws, be effected by racks or other suitable power transmitting means. It is also not absolutely necessary for the motion of the press yokes to take place in a vertical direction and, for various purposes, other arrangements with horizontally or obliquely moving press yokes may be adopted. Finally, the press yokes themselves may remain stationary, when the mould is in operation, and the closing and opening of the mould parts be brought about by the latter themselves being moved with respect to the press yokes, in which case the rotatably attached arms 13 will push against the mould parts, closing and opening them.

Besides the aforesaid possible modifications in the general construction of the press there may also be modifications as regards details. Thus, for instance, the described safety device for the rotatably attached arms may be replaced by any other known kind of safety device used for this purpose in various machines, in so far as it will fulfil the requirements of a press according to the invention.

I claim:

1. A press for the manufacture of hollow articles, such as footwear, from vulcanizable material, comprising: a mould core, lateral heating cheeks, movable towards and away from the mould core, lateral mould parts movable with the said heating cheeks, press yokes disposed in spaced pairs, beams connecting the yokes of each pair together, and a plurality of links, each of said links being pivoted in one of said cheeks and rotatably mounted on one of said beams, for moving said cheeks and the lateral mould parts towards and away from the mould core.

2. A press for the manufacture of hollow articles, such as footwear, from vulcanizable material, comprising: a mould core, lateral heating cheeks, movable towards and away from the mould core, lateral mould parts movable with the said heating cheeks, press yokes movable along said mould parts, said yokes being disposed in spaced pairs, beams connecting the yokes of each pair together, and pivotally connected arms rotatably mounted on the said connecting beams, and deriving motion from the moving press yokes, for moving the lateral heating cheeks and the lateral mould parts towards and away from the mould core.

3. A press for the manufacture of hollow articles, such as footwear, from vulcanizable material, comprising: a mould core, lateral heating cheeks, movable towards and away from the mould core, lateral mould parts movable with the said heating cheeks, press yokes movable along said mould parts, said yokes being disposed in spaced pairs, beams connecting the yokes of each pair together, columns for guiding the movable press yokes, and pivotally connected arms rotatably mounted on the said connecting beams for moving the lateral heating cheeks and the lateral mould parts towards and away from the mould core, the press yokes moving towards one another when the mould is closing and away from one another when the mould is opening.

4. A press for the manufacture of hollow articles, such as footwear, from vulcanizable material, comprising: a mould core, lateral heating cheeks, movable towards and away from the mould core, lateral mould parts movable with the said heating cheeks, press yokes movable along said mould parts, said yokes being disposed in spaced pairs, beams connecting the yokes of each pair together, columns for guiding the movable press yokes, and pivotally connected arms rotatably mounted on the said connecting beams for moving the lateral heating cheeks and the lateral mould parts towards and away from the mould core, the press yokes moving away from one another when the mould is closing and towards one another when the mould is opening.

5. A press for the manufacture of hollow articles, such as footwear, from vulcanizable material, comprising: a mould core, lateral heating cheeks, movable towards and away from the mould core, lateral mould parts movable with the said heating cheeks, movable press yokes disposed in spaced pairs, means for moving said yokes toward and away from one another, beams connecting the yokes of each pair together, sleeves adjustably mounted on the connecting beams, and a plurality of links, each of said links being pivoted in one of said cheeks and rotatably mounted on one of said sleeves for moving the lateral heating cheeks and the lateral mould parts towards and away from the mould core.

6. A press for the manufacture of hollow articles, such as footwear, from vulcanizable material comprising: a mould core, lateral heating cheeks, movable towards and away from the mould core, lateral mould parts movable with the said heating cheeks, movable press yokes disposed in spaced pairs, means for moving said yokes toward and away from one another, beams connecting the yokes of each pair together, sleeves adjustably mounted on the connecting beams, pivotally connected arms rotatably mounted on the said sleeves for moving the lateral heating cheeks and the lateral mould parts towards and away from the mould core, and a common regulating member for adjusting a group of the said sleeves.

7. A press for the manufacture of hollow articles, such as footwear, from vulcanizable material, comprising: a mould core, lateral heating cheeks, movable towards and away from the mould core, lateral mould parts movable with the said heating cheeks, movable press yokes disposed in spaced pairs, means for moving said yokes toward and away from one another, beams connecting the yokes of each pair together, sleeves adjustably mounted on the connecting beams, pivotally connected arms rotatably mounted on the said sleeves for moving the lateral heating cheeks and the lateral mould parts towards and away from the mould core, and means for adjusting the sleeves individually.

8. A press for the manufacture of hollow articles, such as footwear, from vulcanizable material, comprising: a mould core, lateral heating cheeks, movable towards and away from the mould core, lateral mould parts movable with the said heating cheeks, movable press yokes disposed in spaced pairs, means for moving said yokes toward and away from one another, beams connecting the yokes of each pair together, a plurality of links, each of said links being pivoted in one of said cheeks and rotatably mounted on one of said beams for moving the lateral heating cheeks and the lateral mould parts towards and away from the mould core, and a safety device incorporated with at least one of said arms and including an element frangible in response to pressing pressures exceeding a predetermined maximum, the breakage of said element disrupting transmission of power from said beam through said arm.

9. A press for the manufacture of hollow articles, such as footwear, from vulcanizable material, comprising: a mould core, lateral heating cheeks, movable towards and away from the mould core, lateral mould parts movable with the said heating cheeks, upper press yokes, lower press yokes, beams connecting the upper press yokes, means connecting the lower press yokes, pivotally connected arms rotatably mounted on the said connecting beams for moving the lateral heating cheeks and the lateral mould parts towards and away from the mould core, a system of levers provided on the upper press yokes guide bars carried by said upper press yokes, an upper mould part, an upper heating plate associated with the upper mould part and guided by guide bars fixed to the said upper press yokes, and springs supported by the lower press yokes for applying pressing pressure to the upper mould part.

10. A press for the manufacture of hollow articles, such as footwear from vulcanizable material, comprising press yokes and a mould including mould parts movable toward each other to reach mould closing position, the said yokes being spaced and constituting upper and lower yokes movable toward each other along the mould during mould closure, means connected to the parts and operatively connected with the yokes and responsive to the movement of the yokes to effect movement of said parts to mould closing position, columns for guiding the movable yokes, a system of levers provided on the press yokes and moving with them, an upper mould part, an upper heating plate associated with said upper mould part guide bars carried by said upper yoke, said heating plate being guided by said guide bars on the yokes, said heating plate being capable of movement independently of the yokes and supported by the guide bars, and springs supported by the lower press yokes for applying pressing pressure to the upper mould part.

11. A press of the character described including a mould core, mould parts movable toward and away from said core, spaced press yokes movable toward and away from one another in a path transverse of the path of movement of said mould parts, means for moving said yokes, and arms pivotally connected to said mould parts and operatively connected with said yokes for transmitting motion of said yokes to said mould parts to apply pressure to said core.

12. A press as defined in and by claim 5 wherein said sleeves are eccentric.

13. A press as defined in and by claim 11 wherein an eccentric bushing journals said arms at a common pivotal connection thereof.

14. A press of the character described including mould parts movable toward each other to reach mould closing position, press frames each movable toward the other along a path transverse to the path of movement of said parts, and means operatively connected to the parts and frames and responsive to movement of the frames to effect movement of said parts to mould closing position.

15. A press as defined in and by claim 14 and including columns for guiding the movable press frames.

ALOIS BÁNOVSKÝ.

REFERENCES CITED

The following references are of record in the file of this patent:

UNITED STATES PATENTS

| Number | Name | Date |
|---|---|---|
| 722,822 | Doughty | Mar. 17, 1903 |
| 2,221,742 | Hoza | Nov. 12, 1940 |
| 2,389,561 | Stokes, Jr., et al. | Nov. 20, 1945 |